US009956830B2

(12) United States Patent
Otani

(10) Patent No.: US 9,956,830 B2
(45) Date of Patent: May 1, 2018

(54) PNEUMATIC TIRE

(71) Applicant: SUMITOMO RUBBER INDUSTRIES LTD., Kobe-shi (JP)

(72) Inventor: Masafumi Otani, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 295 days.

(21) Appl. No.: 14/703,174

(22) Filed: May 4, 2015

(65) Prior Publication Data

US 2015/0321516 A1 Nov. 12, 2015

(30) Foreign Application Priority Data

May 12, 2014 (JP) ................................ 2014-098621

(51) Int. Cl.

*B60C 15/00* (2006.01)
*B60C 15/06* (2006.01)
*B60C 9/18* (2006.01)
*B60C 5/00* (2006.01)

(52) U.S. Cl.

CPC ............ *B60C 15/0603* (2013.01); *B60C 5/00* (2013.01); *B60C 9/18* (2013.01); *B60C 15/0045* (2013.01); *B60C 2015/009* (2013.01); *B60C 2015/061* (2013.01); *B60C 2200/10* (2013.01)

(58) Field of Classification Search

CPC ............ B60C 15/0045; B60C 15/0603; B60C 2015/061; B15C 2015/009
USPC ......................................................... 152/541
See application file for complete search history.

(56) References Cited

U.S. PATENT DOCUMENTS 5,234,043 A 8/1993 Suzuki et al.
5,429,169 A 7/1995 Igarashi et al.
7,347,239 B2 * 3/2008 Yukawa ............ B29D 30/0654 152/209.18
7,954,529 B2 * 6/2011 Yoshikawa ............ B60C 15/06 152/541
2010/0116391 A1 * 5/2010 Miyazaki ........... B60C 15/0045 152/209.14
2015/0210120 A1 7/2015 Matsunami
2015/0283857 A1 * 10/2015 Asper ................ B60C 15/0045 152/517

FOREIGN PATENT DOCUMENTS

EP 0 456 438 A2 11/1991
EP 0 620 131 A1 10/1994

(Continued)

OTHER PUBLICATIONS

Extended European Search Report dated Sep. 18, 2015 in Patent Application No. 15166588.2.

*Primary Examiner* — Timothy Kennedy
(74) *Attorney, Agent, or Firm* — Oblon, McClelland, Maier & Neustadt, L.L.P.

(57) ABSTRACT

A pneumatic tire for a motorcycle includes a tread having a tread surface which makes contact with ground, a pair of beads each positioned on a radially inner side of the tread, a carcass bridging one of the beads and the other one of the beads, and a reinforcement layer laminated on the carcass on the radially inner side of the tread. Each of the beads includes a core and an apex extending from the core in a radially outward direction, and the apex of each of the beads has an outer edge positioned on a radially outer side of an edge of the tread surface.

20 Claims, 2 Drawing Sheets

14 6 2 16 40 Lpb Pa 44 Lab BE TE 34 (28) 32 (28) 8 36 (30) 42 Pf Lpf 22 10 26 24 38 (30) 18 BL 4

(56) References Cited

FOREIGN PATENT DOCUMENTS

| | | | |
|---|---|---|---|
| EP | 2 899 042 | A1 | 7/2015 |
| JP | 60-236804 | A | 11/1985 |
| JP | 4-146802 | A | 5/1992 |
| JP | 2013-035540 | A | 2/2013 |

* cited by examiner 14
2
6
16
40
Lpb
Pa
44
BE
Lab
TE
34 (28)
32 (28)
8
42
36 (30)
Pf
Lpf
22
10
26
24
38 (30)
18
BL
4

PNEUMATIC TIRE

CROSS-REFERENCE TO RELATED APPLICATIONS

The present application is based upon and claims the benefit of priority to Japanese Patent Application No. 2014-098621, filed May 12, 2014, the entire contents of which are incorporated herein by reference.

BACKGROUND OF THE INVENTION

Field of the Invention

The present invention relates to a pneumatic tire, more specifically, to a pneumatic tire to be mounted on a motorcycle.

Description of Background Art

JP2013-035540A describes an example of study for controlling the rigidity of a side region, namely, the region from the shoulder region to the core of a bead, in a pneumatic tire. The entire contents of this publication are incorporated herein by reference.

SUMMARY OF THE INVENTION

According to one aspect of the present invention, a pneumatic tire for a motorcycle includes a tread having a tread surface which makes contact with ground, a pair of beads each positioned on a radially inner side of the tread, a carcass bridging one of the beads and the other one of the beads, and a reinforcement layer laminated on the carcass on the radially inner side of the tread. Each of the beads includes a core and an apex extending from the core in a radially outward direction, and the apex of each of the beads has an outer edge positioned on a radially outer side of an edge of the tread surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
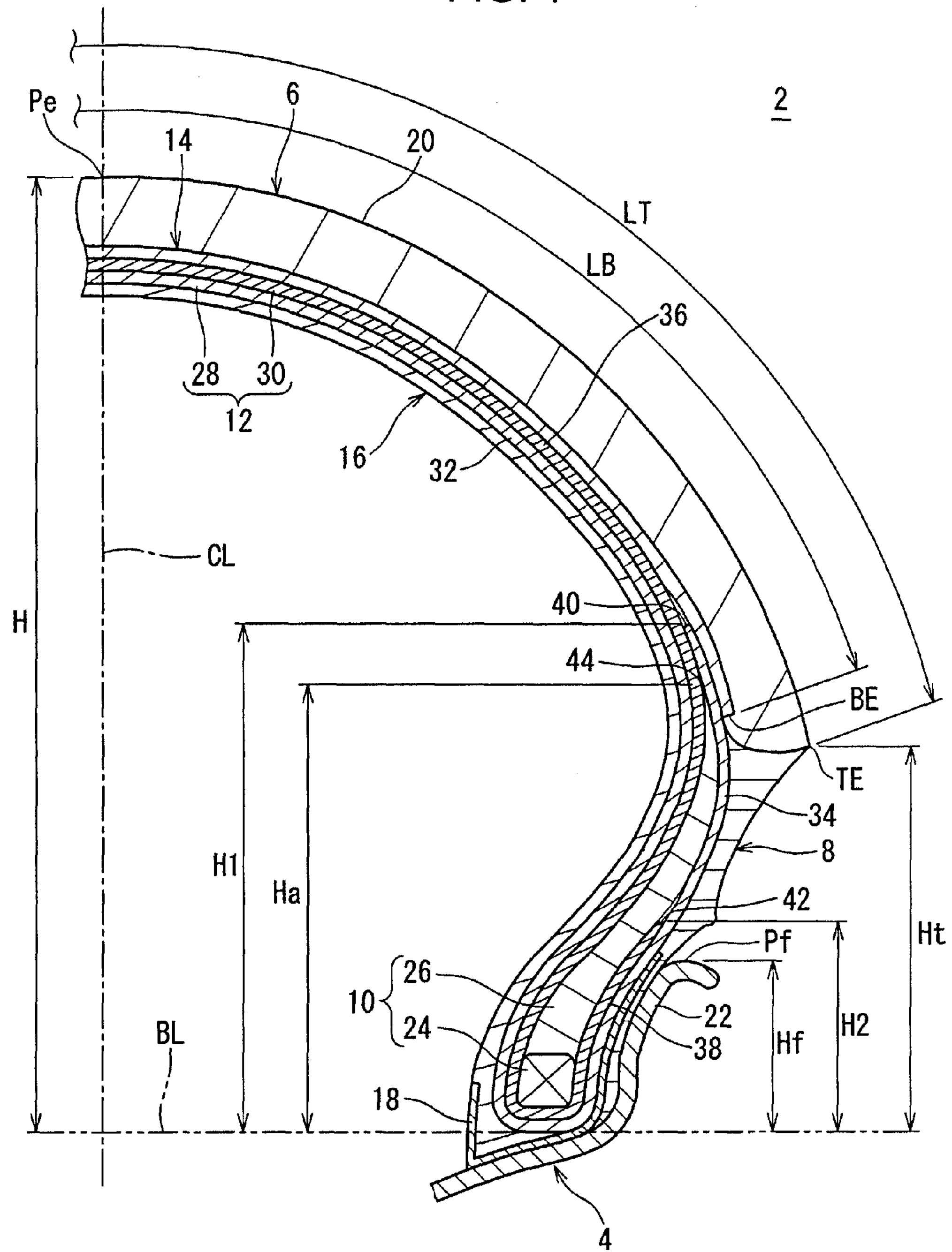
FIG. 1 is a cross-sectional view showing part of a pneumatic tire according to an embodiment of the present invention.

The embodiments will now be described with reference to the accompanying drawings, wherein like reference numerals designate corresponding or identical elements throughout the various drawings.

FIG. 1 shows pneumatic tire 2. Regarding tire 2 in FIG. 1, vertical directions are radial directions, horizontal directions are axial directions, and directions perpendicular to the drawing sheet are circumferential directions. Chain line (CL) in FIG. 1 indicates the equatorial plane of tire 2. Except for the tread patterns, tire 2 is shaped to be symmetrical to the equatorial plane. Two-dot chain line (BL) indicates the bead base line. The bead base line specifies the rim diameter of rim 4 for mounting tire 2 (refer to JATMA.) The bead base line extends in an axial direction.

Rim 4 is a normal rim. In the present application, a normal rim indicates a rim specified in regulations that include standards for tire 2. A normal rim is specified as a "Normal Rim" by JATMA, "Design Rim" by TRA, and "Measuring Rim" by ETRTO.

Tire 2 is provided with tread 6, a pair of sidewalls 8, a pair of beads 10, carcass 12, reinforcement layer 14, inner liner 16, and a pair of chafers 18. Tire 2 is a tubeless tire. Tire 2 is for mounting on a motorcycle.

Tread 6 is shaped to protrude in a radially outward direction. Tread 6 includes tread surface 20 which makes contact with the ground. No groove is formed in tread 6. However, it is an option for tread 6 to have grooves for forming tread patterns. Tread 6 is made of a crosslinked rubber that exhibits excellent wear resistance, heat resistance and grip performance.

In FIG. 1, mark (TE) denotes the edge of tread surface 20. When tire 2 travels straight, it is mainly the region near the equatorial plane (central region) in tread surface 20 that touches the ground. When tire 2 turns, it is mainly an axially outer side of the central region that touches the ground. Especially during full-bank turning, it is mainly the region near edge (TE) of tread surface 20 (shoulder region) that touches the ground.

In FIG. 1, mark (Pe) denotes the intersection of the equatorial plane and tread surface 20. Intersection (Pe) is also referred to as the equator of tire 2. Double-headed arrow (H) indicates the radial height from the bead base line to intersection (PE). Height (H) is the cross-sectional height of tire 2. Double-headed arrow (Ht) indicates the radial height from the bead base line to edge (TE) of tread surface 20.

In tire 2, the ratio of height (Ht) to height (H) is preferred to be 0.6 or lower from the viewpoint of making it easier to bank the vehicle body. For tire 2 to support the vehicle body effectively during full-bank turning, the ratio is preferred to be 0.3 or greater.

Each sidewall 8 extends from an edge of tread 6 in an approximately radially inward direction. Sidewall 8 is made of a crosslinked rubber with excellent cut resistance and weatherability. Sidewall 8 is positioned on the axially outer side of carcass 12. Sidewall 8 prevents damage to carcass 12. Sidewall 8 abuts flange 22 of rim 4.

Each bead 10 is positioned on the radially inner side of tread 6. Bead 10 is positioned on the axially inner side of sidewall 8. Bead 10 includes core 24 and apex 26 that extends from core 24 in a radially outward direction. Core 24 is in a ring shape and includes a wound non-stretchable wire. A typical material for the wire is steel. Apex 26 tapers in a radially outward direction. Apex 26 is made of a crosslinked hard rubber. The hardness of apex 26 of tire 2 is at least 70 but no greater than 95.

The hardness of apex 26 is measured based on "JIS K6253" using a type A durometer. To measure hardness, the durometer is pressed against the cross section shown in FIG. 1 at a temperature of 23° C.

Carcass 12 is formed with first ply 28 and second ply 30. First ply 28 and second ply 30 are bridged between beads 10 on both sides. First ply 28 and second ply 30 extend along tread 6 and sidewalls 8.

Although not shown in the drawings, first ply 28 and second ply 30 are each made of numerous cords arranged parallel to each other and of a topping rubber. The absolute value of the cord angle relative to the equatorial plane is 65~90 degrees. In other words, carcass 12 has a radial structure. Cords are made of organic fibers. Preferred examples of organic fibers are polyester fibers, nylon fibers, rayon fibers, polyethylene naphthalate fibers and aramid fibers.

In tire 2, first ply 28 turns up around core 24 from the axially inner side toward the outer side. Such a turn-up divides first ply 28 into main portion 32 and a pair of turn-up portions 34. Main portion 32 extends from the equatorial plane toward cores 24 on both sides. Each turn-up portion 34 extends from core 24 in a radially outward direction.

In tire 2, second ply 30 turns up around core 24 from the axially inner side toward the outer side. Such turn-up divides second ply 30 into main portion 36 and a pair of turn-up portions 38. On the outer side of main portion 32 of first ply 28, main portion 36 extends from the equatorial plane toward cores 24 on both sides. On the inner side of turn-up portion 34 of first ply 28, each turn-up portion 38 extends from core 24 in a radially outward direction.

In tire 2, edge 40 of turn-up portion 34 of first ply 28 is positioned on the radially outer side of edge 42 of turn-up portion 38 of second ply 30. Edge 40 of turn-up portion 34 of first ply 28 may be positioned on the radially inner side of edge 42 of turn-up portion 38 of second ply 30.

Carcass 12 of tire 2 may be formed with one ply or with three or more plies. When the vehicle for mounting tire 2 is a touring type with a greater weight, carcass 12 is preferred to be formed with two or more plies to secure sufficient rigidity.

Reinforcement layer 14 is positioned on the radially inner side of tread 6. Reinforcement layer 14 is laminated with carcass 12. Reinforcement layer 14 reinforces carcass 12.

Mark (BE) in FIG. 1 denotes an edge of reinforcement layer 14. Edge (BE) of reinforcement layer 14 is positioned near edge (TE) of tread surface 20.

Double-headed arrow (LT) in FIG. 1 indicates the length of tread surface 20. Length (LT) is obtained by measuring along tread 20 from edge (TE) on one end of tread surface 20 to edge (TE) on the other end of tread surface 20. Double-headed arrow (LB) indicates the length of reinforcement layer 14. Length (LB) is obtained by measuring along reinforcement layer 14 from edge (BE) on one end of reinforcement layer 14 to edge (BE) on the other end of reinforcement layer 14.

To achieve reinforcement effects by using reinforcement layer 14, the ratio of length (LB) to length (LT) in tire 2 is preferred to be 0.7 or greater. The ratio is preferred to be 1.0 or smaller to prevent the sidewall region from having different levels of rigidity caused by edge (BE) of reinforcement layer 14.

Although not shown in the drawings, reinforcement layer 14 is made of cords and a topping rubber. The cords of reinforcement layer 14 of tire 2 are helically wound. Reinforcement layer 14 has a so-called jointless structure. The cords extend in a substantially circumferential direction. The angle of the cords relative to the circumferential direction is 5 degrees or less, preferably 2 degrees or less. Reinforcement layer 14 is also referred to as a band. Reinforcement layer 14 contributes to the rigidity of tire 2 in a radial direction. Reinforcement layer 14 reduces the impact of centrifugal force generated while the tire runs. Tire 2 exhibits excellent high-speed stability.

A preferred material for the cords of reinforcement layer 14 is steel. To make a lightweight tire, organic fibers may also be used for the cords. In such a case, examples of organic fibers are nylon fibers, polyester fibers, rayon fibers, polyethylene naphthalate fibers and aramid fibers.

Reinforcement layer 14 of tire 2 may be formed with a cut ply made of numerous cords arranged parallel to each other and with a topping rubber. In such a case, each cord is positioned to incline to the equatorial plane and the absolute value of such an angle is set between 10 and 35 degrees. To enhance reinforcement effects, reinforcement layer 14 may be formed with radially laminated two-cut plies. In such a structure, the inclination direction of the cords of the inner cut ply is set opposite the inclination direction of the cords of the outer cut ply relative to the equatorial plane. Reinforcement layer 14 formed as above is also referred to as a belt. Alternatively, reinforcement layer 14 may be formed with such a belt and the aforementioned band.

Inner liner 16 is positioned on the inner side of carcass 12. Inner liner 16 is bonded to the internal surface of carcass 12. Inner liner 16 is made of a crosslinked rubber with excellent air impermeability. A typical rubber material for inner liner 16 is a butyl rubber or a halogenated butyl rubber. Inner liner 16 maintains the inflation pressure of tire 2.

Each chafer 18 is positioned near bead 10. When tire 2 is mounted on rim 4, chafer 18 abuts rim 4. Such an abutting structure protects the vicinity of bead 10. In the present embodiment, chafer 18 is made of cloth and a rubber impregnated in the cloth.

Figure 2:
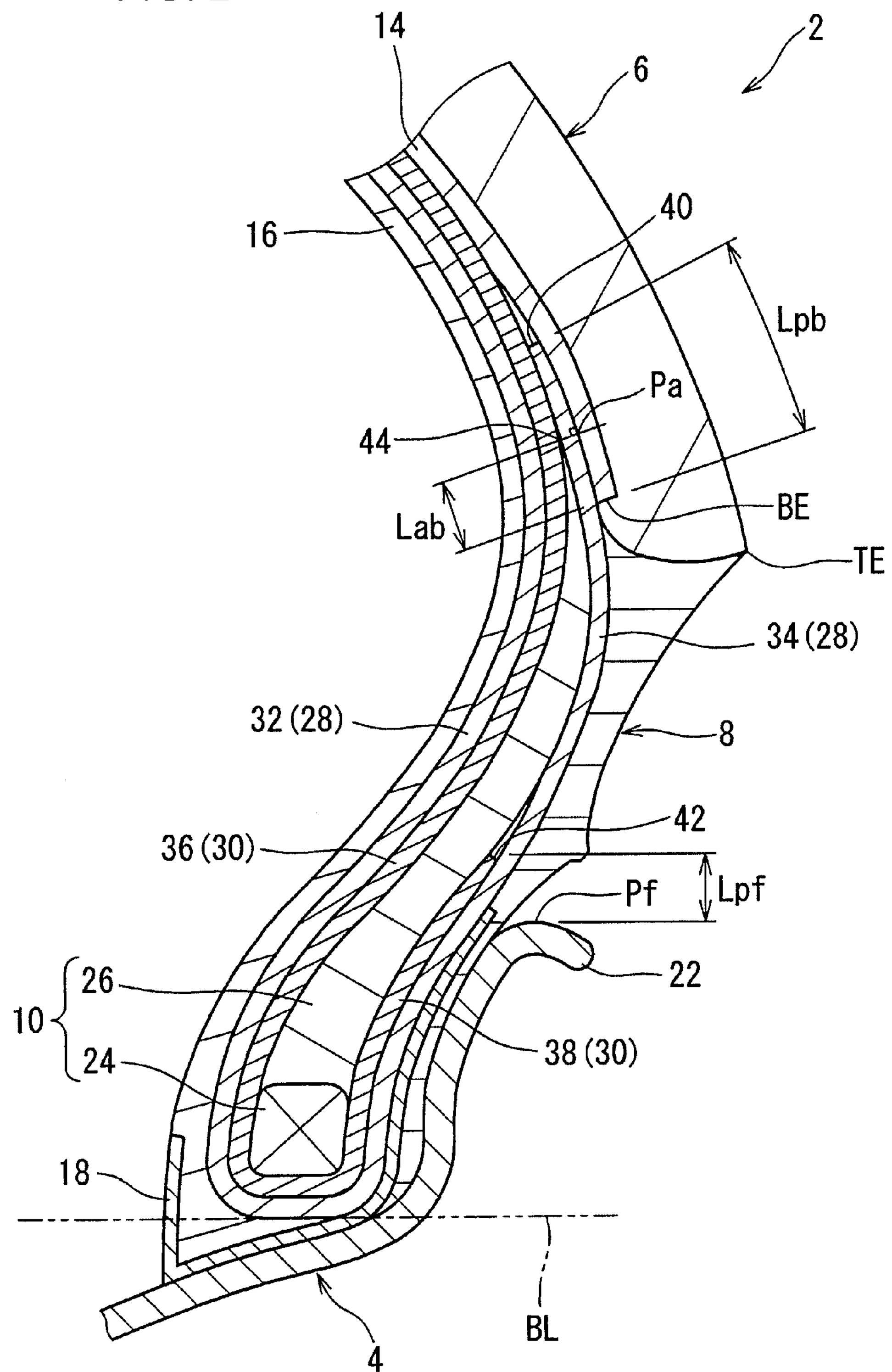
FIG. 2 is an enlarged cross-sectional view showing part of the tire in FIG. 1.

As shown in FIG. 2, apex 26 of tire 2 is positioned in a region that extends from the shoulder region to core 24 of bead 10, namely, the side region. Apex 26 is set to be tall, that is, the height of apex 26 is set to be greater than that of a conventional apex. Since apex 26 contributes effectively to the lateral rigidity of tire 2, excellent handling is achieved in tire 2. Tire 2 exhibits excellent steering stability and high-speed stability.

Outer edge 44 of apex 26 of tire 2 is positioned on the radially outer side of edge (TE) of tread surface 20. In tire 2, outer edge 44 of apex 26 is less likely to become a bending starting point. Since the side region of tire 2 warps as a whole, excellent shock-absorption is achieved. Tire 2 exhibits excellent riding comfort. In addition, enhanced steering stability and high-speed stability are achieved because of tall apex 26 as described above. According to an embodiment of the present invention, motorcycle pneumatic tire 2 with enhanced steering stability and high-speed stability is obtained without sacrificing riding comfort.

In FIG. 2, mark (Pa) denotes the intersection where a normal line to the internal surface of reinforcement layer 14 that passes through outer edge 44 of apex 26 intersects the internal surface. In the present application, intersection (Pa) corresponds to outer edge 44 of apex 26. Double-headed arrow (Lab) indicates the length from edge (BE) of reinforcement layer 14 to intersection (Pa). Length (Lab) is the length where apex 26 overlaps reinforcement layer 14. Length (Lab) is shown as a positive number. When apex 26 is separated from reinforcement layer 14, intersection (Pa) cannot be determined. In such a case, if turn-up portion 34 overlaps reinforcement layer 14 as shown in FIG. 2, the outer surface of turn-up portion 34 is set as a virtual internal surface of reinforcement layer 14, and intersection (Pa) is determined based on the virtual internal surface so that length (Lab) is obtained. If a virtual internal surface of reinforcement layer 14 cannot be specified, length (Lab) is indicated as the minimum distance from edge (BE) of reinforcement layer 14 to outer edge 44 of apex 26. When apex 26 is separated from reinforcement layer 14, length (Lab) will be shown as a negative number. Moreover, if length (Lab) is 0 mm, that means outer edge 44 of apex 26 corresponds to edge (BE) of reinforcement layer 14.

In tire 2, apex 26 is preferred to overlap reinforcement layer 14. As shown in FIG. 2, outer edge 44 of apex 26 in tire 2 is positioned on the radially outer side of edge (BE) of reinforcement layer 14. More specifically, outer edge 44 of apex 26 is sandwiched between reinforcement layer 14 and main portion 36 of second ply 30. Outer edge 44 of apex 26 is not distinctive in the side region of tire 2. Outer edge 44 of apex 26 in tire 2 is unlikely to become a bending starting point. The side region of tire 2 warps as a whole. The position of apex 26 relative to reinforcement layer 14 contributes to the shock-absorption of tire 2. Excellent riding comfort is achieved in tire 2.

Length (Lab) in tire 2 is preferred to be 10 mm or less. When length (Lab) is set at 10 mm or less, the portion where apex 26 overlaps reinforcement layer 14 is effectively suppressed from adversely affecting the rigidity of tire 2. The overlapped portion is not distinctive in tire 2. Tire 2 exhibits a smooth transition from traveling straight to turning and from turning to traveling straight. Excellent handling is achieved in Tire 2. Tire 2 exhibits excellent steering stability and high-speed stability.

Length (Lab) in tire 2 is preferred to be −5 mm or greater. In other words, even when apex 26 does not overlap reinforcement layer 14, it is sufficient if outer edge 44 of apex 26 is positioned within 5 mm of edge (BE) of reinforcement layer 14. The border of apex 26 and reinforcement layer 14 is effectively suppressed from adversely affecting the rigidity of the side region of tire 2. The border is not distinctive in tire 2. The border is unlikely to become a bending starting point in tire 2. The side region of tire 2 warps as a whole. Excellent shock absorption is achieved in tire 2. Tire 2 exhibits excellent riding comfort. Moreover, since apex 26 effectively contributes to the lateral rigidity of tire 2, excellent handling is maintained. Tire 2 exhibits excellent steering stability and high-speed stability.

In tire 2, turn-up portion 34 of first ply 28 is preferred to overlap reinforcement layer 14. As shown in FIG. 2, edge 40 of turn-up portion 34 of first ply 28 is positioned on the radially outer side of edge (BE) of reinforcement layer 14. More specifically, edge 40 of turn-up portion 34 of first ply 28 is sandwiched between reinforcement layer 14 and main portion 36 of second ply 30. Edge 40 of turn-up portion 34 of first ply 28 is not distinctive in the side region of tire 2. Edge 40 of turn-up portion 34 of first ply 28 is unlikely to become a bending starting point in tire 2. The side region of tire 2 warps as a whole. The position of turn-up portion 34 of first ply 28 relative to reinforcement layer 14 contributes to the shock absorption of tire 2. Tire 2 exhibits excellent riding comfort.

In FIG. 2, double-headed arrow (Lpb) indicates the length where turn-up portion 34 of first ply 28 overlaps reinforcement layer 14. Length (Lpb) is obtained by measuring from edge (BE) of reinforcement layer 14 to edge 40 of turn-up portion 34 of first ply 28 along the border of reinforcement layer 14 and turn-up portion 34 of first ply 28.

Length (Lpb) in tire 2 is preferred to be 20 mm or less. When length (Lpb) is set at 20 mm or less, the portion where turn-up portion 34 of first ply 28 overlaps reinforcement layer 14 is effectively suppressed from adversely affecting the rigidity of tire 2. The overlapped portion is not distinctive in tire 2. Tire 2 exhibits a smooth transition from straight traveling to turning and from turning to straight traveling. Excellent handling is maintained in tire 2. Tire 2 exhibits excellent steering stability and high-speed stability. Length (Lpb) is preferred to be at least 1 mm. By so setting, edge 40 of turn-up portion 34 of first ply 28 is prevented from adversely affecting warping in the side region. The side region of tire 2 warps as a whole. Since excellent shock absorption is achieved, tire 2 exhibits excellent riding comfort. Moreover, since turn-up portion 34 of first ply 28 effectively contributes to the lateral rigidity of tire 2, excellent handling is achieved. Tire 2 exhibits excellent steering stability and high-speed stability.

In tire 2, part of reinforcement layer 14 covers edge 40 of turn-up portion 34 of first ply 28. Reinforcement layer 14 effectively binds edge 40 of turn-up portion 34 of first ply 28. To achieve sufficient binding force by reinforcement layer 14, reinforcement layer 14 is preferred to be formed as a band containing cords that are helically wound in substantially a circumferential direction.

In FIG. 2, mark (Pf) denotes the outer edge of flange 22 of rim 4 for mounting tire 2. Double-headed arrow (Lpf) indicates the radial length from outer edge (Pf) to edge 42 of turn-up portion 38 of second ply 30. In the present application, when edge 42 of turn-up portion 38 of second ply 30 is positioned on the radially outer side of outer edge (Pf), length (Lpf) is shown as a positive number, whereas if edge 42 of turn-up portion 38 of second ply 30 is positioned on the radially inner side of outer edge (P1), length (Lpf) is shown as a negative number. If length (Lpf) is 0 mm, it means edge 42 of turn-up portion 38 of second ply 30 corresponds to outer edge (Pf) in a radial direction.

Length (Lpf) in tire 2 is preferred to be 5 mm or less. By setting length (Lpf) at 5 mm or less, edge 42 of turn-up portion 38 of second ply 30 is prevented from adversely affecting warping in the side region. The side region of tire 2 warps as a whole. Since excellent shock absorption is achieved, tire 2 exhibits excellent riding comfort. Length (Lpf) is preferred to be −15 mm or greater. By setting length (Lpf) at −15 mm or greater, turn-up portion 38 of second ply 30 effectively contributes to the lateral rigidity of tire 2. Since excellent handling is achieved, tire 2 exhibits excellent steering stability and high-speed stability.

The rigidity in the region from edge (TE) of tread surface 20 to outer edge (Pf) of flange 22 affects warping in the side region. In tire 2, not only is tall apex 26 employed, but also outer edge 44 of apex 26, edge 40 of turn-up portion 34 of first ply 28 and edge 42 of turn-up portion 38 of second ply 30 are all formed in positions that are unlikely to become a bending starting point. The side region of tire 2 warps smoothly as a whole. Moreover, the side region effectively contributes to the lateral rigidity of tire 2. Tire 2 exhibits excellent shock absorption and handling. Steering stability and high-speed stability are enhanced in tire 2 without reducing riding comfort. Tire 2 according to an embodiment of the present invention is significantly effective when it is mounted on a touring motorcycle with a vehicle weight of 300 kg or greater.

In FIG. 1, double-headed arrow (Ha) indicates the radial height from the bead base line to outer edge 44 of apex 26. Double-headed arrow (H1) indicates the radial height from the bead base line to edge 40 of turn-up portion 34 of first ply 28. Double-headed arrow (H2) indicates the radial height from the bead base line to edge 42 of turn-up portion 38 of second ply 30. Double-headed arrow (Hf) indicates the radial height from the bead base line to outer edge (Pf). Height (Hf) is the height of flange 22. In tire 2, height (H2) and height (Hf) have a difference (H2−Hf) that is equal to aforementioned length (Lpf).

Height (Ha) in tire 2 is preferred to be 33 mm or greater. By so setting, apex 26 effectively contributes to the lateral rigidity of tire 2, while outer edge 44 of apex 26 is located in a position that is unlikely to become a bending starting point. Steering stability and high-speed stability are enhanced in tire 2 without reducing riding comfort. Height (Ha) is preferred to be 50 mm or less. By so setting, the impact of apex 26 on riding comfort and on the tire mass is effectively reduced.

Height (H1) in tire 2 is preferred to be 30 mm or greater. By so setting, turn-up portion 34 of first ply 28 effectively contributes to the lateral rigidity of tire 2. Height (H1) is preferred to be 55 mm or less. By so setting, the impact of turn-up portion 34 of first ply 28 on riding comfort and on the tire mass is effectively reduced.

Height (H2) in tire 2 is preferred to be 5 mm or greater. By so setting, turn-up portion 38 of second ply 30 effectively contributes to the lateral rigidity of tire 2. Height (H2) is preferred to be 20 mm or less. By so setting, the impact of the turn-up portion on riding comfort and on the tire mass is effectively reduced.

The dimensions and angles of the members of tire 2 are measured when tire 2 is mounted on a normal rim and air is filled in tire 2 at a normal inflation pressure. No load is applied on tire 2 when measuring is conducted.

In the present application, a normal inflation pressure indicates the air pressure specified by regulations that include standards for tire 2. For example, it is specified as "Maximum Air Pressure" by JATMA regulations, a maximum value listed in "Tire Load Limits at Various Cold Inflation Pressures" by TRA regulations, and "Inflation Pressure" by ETRTO regulations.

EXAMPLES

In the following, the effects according to an embodiment of the present invention are made clear by the examples. However, the present invention is not limited to the descriptions of those examples.

Example 1

A tire shown in FIGS. 1 and 2 was prepared. The tire size is 120/70ZR17. The outer edge of the apex was positioned on the radially outer side of edge (TE) of the tread surface. Such a position is indicated as "out" in the "position" column of the table. Height (Ha) of the apex is 40 mm, height (H1) of the turn-up portion of the first ply is 40 mm, and height (H2) of the turn-up portion of the second ply is 15 mm Length (Lpb) from edge (BE) of the reinforcement layer to the edge of the turn-up portion of the first ply is 4 mm. Length (Lab) from edge (BE) of the reinforcement layer to the outer edge of the apex is 4 mm Radial length (Lpf) is set at 1 mm from outer edge (Pf) of the flange to the edge of the turn-up portion of the first ply.

Example 2~5 and Comparative Example 2

Tires were prepared for Example 2~5 and Comparative Example 2 the same as in Example 1 except that height (Ha) in each tire was adjusted to have length (Lab) as listed in Table 1 below. In Comparative Example 2, the outer edge of the apex was positioned on the radially inner side of edge (TE) of the tread surface. Such a position is indicated as "in" in the "position" column of the table.

Comparative Example 1

A conventional tire was used as Comparative Example 1.

Example 6~11

Tires were prepared for Example 6~11 the same as in Example 1 except that height (H1) and height (H2) were adjusted in each tire to obtain length (Lpb) and length (Lpf) as listed in Table 2 below.

Example 12~15

Tires were prepared for Example 12~15 the same as in Example 1 except that height (H2) was adjusted in each tire to obtain length (Lpf) as listed in Table 3 below.

Handling

Each test tire was mounted on the front wheel of a touring motorcycle (4-cycle engine) with a displacement of 1300 cc, and air was filled in the tire at an inflation pressure of 250 kPa. The vehicle weight of the motorcycle was 300 kg. The rim of the front wheel was MT3.50. A commercially available tire (size=180/55ZR17) was mounted on a rear wheel, and air was filled in the tire at an inflation pressure of 290 kPa. The rim of the rear wheel was MT5.50. A rider drove the motorcycle on the asphalt road surface of a circuit course and conducted sensory evaluations of handling. The results are shown in Table 1~3 in indices based on the result of Example 8 being set as 100. The greater the value is, the better the handling is, and that indicates excellent steering stability and high-speed stability.

Shock Absorption

The aforementioned motorcycle with mounted test tires was driven over a bump, and sensory evaluation was conducted on the shock absorption of each test tire. The results are shown in Table 1~3 in indices based on the result of Example 8 being set as 100. The greater the value is, the better the shock absorption is, and that indicates excellent riding comfort. The bump used for the evaluation was a larger bump with dimensions of lower bottom/upper bottom/height of 80 mm/30 mm/30 mm and a smaller bump with dimensions of lower bottom/upper bottom/height of 50 mm/30 mm/10 mm.

Total Evaluation

The total points of indices obtained as the evaluation results of handling and shock absorption were calculated. The results are shown in the column "total points" in the tables. The greater the value is, the better the tire is.

TABLE 1

| Evaluation Results | | | | | | | |
|---|---|---|---|---|---|---|---|
| | Comp. Example 1 | Comp. Example 2 | Example 2 | Example 3 | Example 1 | Example 4 | Example 5 |
| Height (Ha) [mm] | 25 | 30 | 33 | 35 | 40 | 45 | 50 |
| Position | in | in | out | out | out | out | out |
| Height (H1) [mm] | 30 | 40 | 40 | 40 | 40 | 40 | 40 |
| Height (H2) [mm] | 20 | 15 | 15 | 15 | 15 | 15 | 15 |

TABLE 1-continued

| Evaluation Results | | | | | | | |
|---|---|---|---|---|---|---|---|
| | Comp. Example 1 | Comp. Example 2 | Example 2 | Example 3 | Example 1 | Example 4 | Example 5 |
| Length (Lpb) [mm] | −6 | 4 | 4 | 4 | 4 | 4 | 4 |
| Length (Lab) [mm] | −12 | −6 | −3 | 1 | 4 | 9 | 15 |
| Length (Lpf) [mm] | 6 | 1 | 1 | 1 | 1 | 1 | 1 |
| Shock absorption | 80 | 95 | 100 | 105 | 110 | 100 | 95 |
| Handling | 80 | 90 | 100 | 105 | 110 | 105 | 95 |
| (Total points) | 160 | 185 | 200 | 210 | 220 | 205 | 190 |

TABLE 2

| Evaluation Results | | | | | | |
|---|---|---|---|---|---|---|
| | Example 6 | Example 7 | Example 8 | Example 9 | Example 10 | Example 11 |
| Height (Ha) [mm] | 40 | 40 | 40 | 40 | 40 | 40 |
| Position | out | out | out | out | out | out |
| Height (H1) [mm] | 30 | 35 | 40 | 45 | 50 | 55 |
| Height (H2) [mm] | 20 | 20 | 20 | 15 | 15 | 15 |
| Length (Lpb) [mm] | −6 | 1 | 4 | 9 | 15 | 22 |
| Length (Lab) [mm] | 4 | 4 | 4 | 4 | 4 | 4 |
| Length (Lpf) [mm] | 6 | 6 | 6 | 1 | 1 | 1 |
| Shock absorption | 95 | 100 | 100 | 110 | 105 | 105 |
| Handling | 90 | 95 | 100 | 105 | 100 | 95 |
| (Total points) | 185 | 195 | 200 | 215 | 205 | 200 |

TABLE 3

| Evaluation Results | | | | |
|---|---|---|---|---|
| | Example 12 | Example 13 | Example 14 | Example 15 |
| Height (Ha) [mm] | 40 | 40 | 40 | 40 |
| Position | out | out | out | out |
| Height (H1) [mm] | 40 | 40 | 40 | 40 |
| Height (H2) | 5 | 10 | 18 | 20 |
| Length (Lpb) [mm] | 4 | 4 | 4 | 4 |
| Length (Lab) [mm] | 4 | 4 | 4 | 4 |
| Length (Lpf) [mm] | −9 | −4 | 4 | 6 |
| Shock absorption | 110 | 115 | 105 | 100 |
| Handling | 95 | 100 | 105 | 100 |
| (Total points) | 205 | 215 | 210 | 200 |

As shown in Table 1~3, tires in the examples have higher evaluation results than the tires in the comparative examples. The evaluation results clearly show tires according to embodiments of the present invention are excellent.

The tire described above can be used for various motorcycles.

When a motorcycle turns, the rider banks the vehicle body. To make turning easier, a tread with a smaller curvature radius is employed for motorcycle tires.

When a motorcycle travels straight, tires touch the ground in the region at the equatorial plane of the tread (central region). When a motorcycle turns, tires touch the ground in the region on an axially outer side of the central region. Motorcycle riders often bank their motorcycles to the extreme. Such a situation is referred to as "full-bank turning." In full-bank turning, an edge of the tread (shoulder region) touches the ground.

Motorcycles in recent years have exhibited significantly enhanced performance. Thus, tires to be mounted on motorcycles are required to further improve their properties.

Steering stability and riding comfort are important properties of tires. To enhance such properties, controlling the rigidity of a side region, namely, the region from the shoulder region to the core of a bead, has been studied.

The height of an apex in a conventional tire, that is, the height from the bead base line to the radially outer edge of the apex, is 20~30 mm. To enhance steering stability and high-speed stability, an apex height set greater than that of a normal apex may be occasionally employed. The outer edge of such an apex tends to become a bending starting point. For example, if the outer edge of an apex is on the radially inner side of the edge of the tread surface, the side region of the tire starts warping at the portion of the outer edge. Then, when the outer-edge portion is completely warped, the other portions start warping. The side region of the tire will not warp as a whole. Such warping that occurs step by step in the side region adversely affects riding comfort. Such warping in the side region occurs significantly in heavy touring motorcycles.

To reinforce the carcass, a reinforcement layer may occasionally be laminated on the carcass in the radially inner side of the tread. If the apex is positioned to have a distance between it and such a reinforcement layer, the distance will adversely affect rigidity at the border between the reinforcement layer and the apex. Thus, in addition to the outer edge of the apex, the border may also become a bending starting point. Depending on the size of the distance between the apex and the reinforcement layer, the riding comfort of the tire may even be lowered.

A carcass ply is usually turned up around the core of the bead. Accordingly, a turn-up portion of the carcass ply is formed to extend from the core in a radially outward direction. The edge of the turn-up portion tends to be a bending starting point of the side region. The edge position of the turn-up portion also affects the riding comfort of the tire. When the outer edge of an apex is positioned on the radially inner side of the edge of the tread surface, and the edge of the turn-up portion corresponds to the outer edge of the apex in a radial direction, riding comfort of the tire may significantly decrease.

A greater load is exerted on the side region near the flange of a rim. Thus, when the edge of a turn-up portion is located near the flange, the side region will not warp as a whole depending on the position of the edge of the turn-up portion relative to the flange. Accordingly, riding comfort may decrease.

A pneumatic tire for a motorcycle according to an embodiment of the present invention exhibits enhanced steering stability and high-speed stability without reducing riding comfort.

A pneumatic tire according to an embodiment of the present invention has a tread, a pair of beads, a carcass and a reinforcement layer. The tread includes the tread surface which makes contact with the ground. Each bead is positioned on the radially inner side of the tread. The carcass is bridged between one bead and the other bead. The reinforcement layer is laminated on the carcass on the radially inner side of the tread. Each bead is provided with a core and an apex, and the apex extends from the core in a radially outward direction. The outer edge of the apex is positioned on the radially outer side of the edge of the tread surface.

In the pneumatic tire, the apex is preferred to overlap the reinforcement layer. If the apex does not overlap the reinforcement layer, the outer edge of the apex is preferred to be positioned within 5 mm of the edge of the reinforcement layer.

In the pneumatic tire, the length where the apex overlaps the reinforcement layer is preferred to be 10 mm or less.

In the pneumatic tire, the carcass is preferred to contain a first ply. The first ply is turned up around the core from the axially inner side toward the outer side. The turn-up structure divides the first ply into the main portion which extends from the equatorial plane toward the core and the turn-up portion which extends from the core in a radially outward direction. The turn-up portion overlaps the reinforcement layer.

In the pneumatic tire, the length where the turn-up portion overlaps the reinforcement layer is preferred to be 20 mm or less.

In the pneumatic tire, the carcass is preferred to further contain a second ply. The second ply is turned up around the core from the axially inner side toward the outer side. The turn-up structure divides the second ply into the main portion that extends from the equatorial plane toward the core and the turn-up portion that extends from the core in a radially outward direction. The radial length from the radially outer edge of the flange of a rim for mounting the tire to the edge of the turn-up portion of the second ply is 5 mm or less.

In a pneumatic tire according to an embodiment of the present invention, the outer edge of an apex is positioned on the radially outer side of the edge of the tread surface. The outer edge of the apex is unlikely to become a bending starting point. Since the side region warps as a whole, the tire exhibits excellent riding comfort. In addition, the height of the apex is set to be great. Since the apex effectively contributes to the lateral rigidity of the tire, the steering stability and high-speed stability of the tire are enhanced. According to an embodiment of the present invention, a pneumatic tire for a motorcycle with enhanced steering stability and high-speed stability is obtained without reducing riding comfort.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire for a motorcycle, comprising:

a tread having a tread surface configured to contact with ground;

a pair of beads each positioned on a radially inner side of the tread;

a carcass bridging one of the beads and the other one of the beads;

a pair of sidewalls each extending from an edge of the tread in a radially inward direction; and a reinforcement layer laminated on the carcass on the radially inner side of the tread and comprising a plurality of cords, wherein the carcass comprises a first ply and a second ply and is turned up around the core from the axially inner side toward outer side such that each of the first ply and the second ply has a main portion extending from an equatorial plane toward the core and a turn-up portion extending from the core in the radially outward direction and that an edge of the turn-up portion of the first ply is positioned on a radially outer side of an edge of the turn-up portion of the second ply, each of the beads includes a core and an apex extending from the core in a radially outward direction, and the apex of each of the beads has an outer edge positioned with respect to an edge of the tread surface at the edge of the tread such that the outer edge of the apex has a radial height Ha which is greater than a radial height Ht of the edge of the tread surface where the radial height Ha and the radial height Ht are measured from a bead base line BL.

2. The pneumatic tire for a motorcycle according to claim 1, wherein the apex of each of the beads is set such that the apex is overlapping the reinforcement layer or such that the apex is not overlapping the reinforcement layer, and the outer edge of the apex is positioned within 5 mm of the edge of the reinforcement layer.

3. The pneumatic tire for a motorcycle according to claim 2, wherein the apex has a portion overlapping the reinforcement layer in a length Lab of 10 mm or less.

4. The pneumatic tire for a motorcycle according to claim 1, wherein the turn-up portion of the first ply is overlapping the reinforcement layer.

5. The pneumatic tire for a motorcycle according to claim 4, wherein the turn-up portion of the first ply has a portion overlapping the reinforcement layer in a length Lpb of 20 mm or less.

6. The pneumatic tire for a motorcycle according to claim 2, wherein the turn-up portion of the first ply is overlapping the reinforcement layer.

7. The pneumatic tire for a motorcycle according to claim 6, wherein the turn-up portion of the first ply has a portion overlapping the reinforcement layer in a length Lpb of 20 mm or less.

8. The pneumatic tire for a motorcycle according to claim 3, wherein the turn-up portion of the first ply is overlapping the reinforcement layer.

9. The pneumatic tire for a motorcycle according to claim 8, wherein the turn-up portion of the first ply has a portion overlapping the reinforcement layer in a length Lpb of 20 mm or less.

10. The pneumatic tire for a motorcycle according to claim 1, wherein the turn-up portion of the second ply has an edge configured to have a radial length Lpf of 5 mm or less from a radially outer edge of a flange of a rim when the pneumatic tire is mounted to the rim.

11. The pneumatic tire for a motorcycle according to claim 2, wherein the turn-up portion of the second ply has an edge configured to have a radial length Lpf of 5 mm or less from a radially outer edge of a flange of a rim when the pneumatic tire is mounted to the rim.

12. The pneumatic tire for a motorcycle according to claim 3, wherein the turn-up portion of the second ply has an edge configured to have a radial length Lpf of 5 mm or less from a radially outer edge of a flange of a rim when the pneumatic tire is mounted to the rim.

13. The pneumatic tire for a motorcycle according to claim 4, wherein the turn-up portion of the second ply has an edge configured to have a radial length Lpf of 5 mm or less from a radially outer edge of a flange of a rim when the pneumatic tire is mounted to the rim.

14. The pneumatic tire for a motorcycle according to claim 5, wherein the turn-up portion of the second ply has an edge configured to have a radial length Lpf of 5 mm or less from a radially outer edge of a flange of a rim when the pneumatic tire is mounted to the rim.

15. The pneumatic tire for a motorcycle according to claim 6, wherein the turn-up portion of the second ply has an edge configured to have a radial length Lpf of 5 mm or less from a radially outer edge of a flange of a rim when the pneumatic tire is mounted to the rim.

16. The pneumatic tire for a motorcycle according to claim 7, wherein the turn-up portion of the second ply has an edge configured to have a radial length Lpf of 5 mm or less from a radially outer edge of a flange of a rim when the pneumatic tire is mounted to the rim.

17. The pneumatic tire for a motorcycle according to claim 8, wherein the turn-up portion of the second ply has an edge configured to have a radial length Lpf of 5 mm or less from a radially outer edge of a flange of a rim when the pneumatic tire is mounted to the rim.

18. The pneumatic tire for a motorcycle according to claim 9, wherein the turn-up portion of the second ply has an edge configured to have a radial length Lpf of 5 mm or less from a radially outer edge of a flange of a rim when the pneumatic tire is mounted to the rim.

19. The pneumatic tire for a motorcycle according to claim 1, wherein the outer edge of the apex is positioned with respect to the edge of the tread surface such that the radial height Ha of the outer edge of the apex is in a range of 33 mm to 50 mm from the bead base line BL.

20. The pneumatic tire for a motorcycle according to claim 2, wherein the outer edge of the apex is positioned with respect to the edge of the tread surface such that the radial height Ha of the outer edge of the apex is in a range of 33 mm to 50 mm from the bead base line BL.

* * * * *